US006769193B1

(12) United States Patent
Meisner

(10) Patent No.: US 6,769,193 B1
(45) Date of Patent: Aug. 3, 2004

(54) STAPLE GUN IMPROVEMENT

(76) Inventor: David Meisner, 4285 Gershwin Ave. North, Oakdale, MN (US) 55128

( * ) Notice: Subject to any disclaimer, the term of this patent is extended or adjusted under 35 U.S.C. 154(b) by 0 days.

(21) Appl. No.: 10/400,905

(22) Filed: Mar. 27, 2003

(51) Int. Cl.[7] .............................. G01B 5/24; B25C 7/00
(52) U.S. Cl. .......................................... 33/645; 227/107
(58) Field of Search .......................... 33/201, 613, 645, 33/666, 669, 677, 574, 577, 578; 227/107, 114, 139, 140, 142

(56) References Cited

U.S. PATENT DOCUMENTS

| | | | | | |
|---|---|---|---|---|---|
| 4,280,279 | A | * | 7/1981 | Grundfest | 33/613 |
| 4,571,838 | A | * | 2/1986 | Stout, III | 33/645 |
| 5,138,772 | A | * | 8/1992 | Barnes | 33/613 |
| 5,223,675 | A | * | 6/1993 | Taft | 174/159 |
| 5,509,489 | A | * | 4/1996 | Lower, Jr. | 227/110 |
| 5,605,269 | A | * | 2/1997 | Musiani | 227/109 |
| 5,884,829 | A | * | 3/1999 | Wingert | 227/142 |
| 5,970,621 | A | * | 10/1999 | Bazydola et al. | 33/613 |
| 6,170,729 | B1 | * | 1/2001 | Lin | 227/142 |
| 6,393,711 | B1 | * | 5/2002 | Freund | 33/646 |
| 6,543,666 | B1 | * | 4/2003 | Huang | 227/18 |
| 6,662,989 | B1 | * | 12/2003 | Chang et al. | 227/130 |
| 2002/0073567 | A1 | * | 6/2002 | Freund | 33/647 |
| 2002/0121067 | A1 | * | 9/2002 | Nien et al. | 52/717.01 |

OTHER PUBLICATIONS

The Striker XS76–8650; http://www.spotnails.com/productDetail.asp?productID=74&productLine=1; 2 pages, no date.
Spotnails; Model XS76/8650; Jun. 21, 2002; 2 pages, no date.
http://www.spotnails.com/product.asp?productID=74&tool=XS76–8650&desc=Medium+Crown+Stapler . . . ; 2 pages, no date.
The Striker XS1640; http://www.spotnails.com/productDetail.asp?productID=67&productLine=1; Feb. 24, 2003; 3 pages, no date.
The Striker XS2640; http://www.spotnails.com/productDetail.asp?productID=69&productLine=1; Feb. 24, 2003; 1 page, no date.
The Striker XS3640; http://www.spotnails.com/productDetail.asp?productID=67&productLine=1; Feb. 24, 2003; 1 page., No date.

* cited by examiner

*Primary Examiner*—G. Bradley Bennett
(74) *Attorney, Agent, or Firm*—Faegre & Benson LLP

(57) ABSTRACT

An improvement in the form of an attachment for staple guns including alignment pins aligned with a staple delivery position and located sufficiently close to the staple delivery position to enable staple delivery within a mounting aperture in a frame of a vinyl window or other vinyl construction finishing product. The alignment pins may be secured to the attachment or formed integrally with the attachment or be part of a separate clip securable to the attachment.

15 Claims, 9 Drawing Sheets

STAPLE GUN IMPROVEMENT

BACKGROUND OF THE INVENTION

This invention relates to the field of fastener installers, more particularly, to an improvement for staple guns for installing vinyl millwork such as windows and doors.

DETAILED DESCRIPTION OF THE INVENTION

Figure 1:
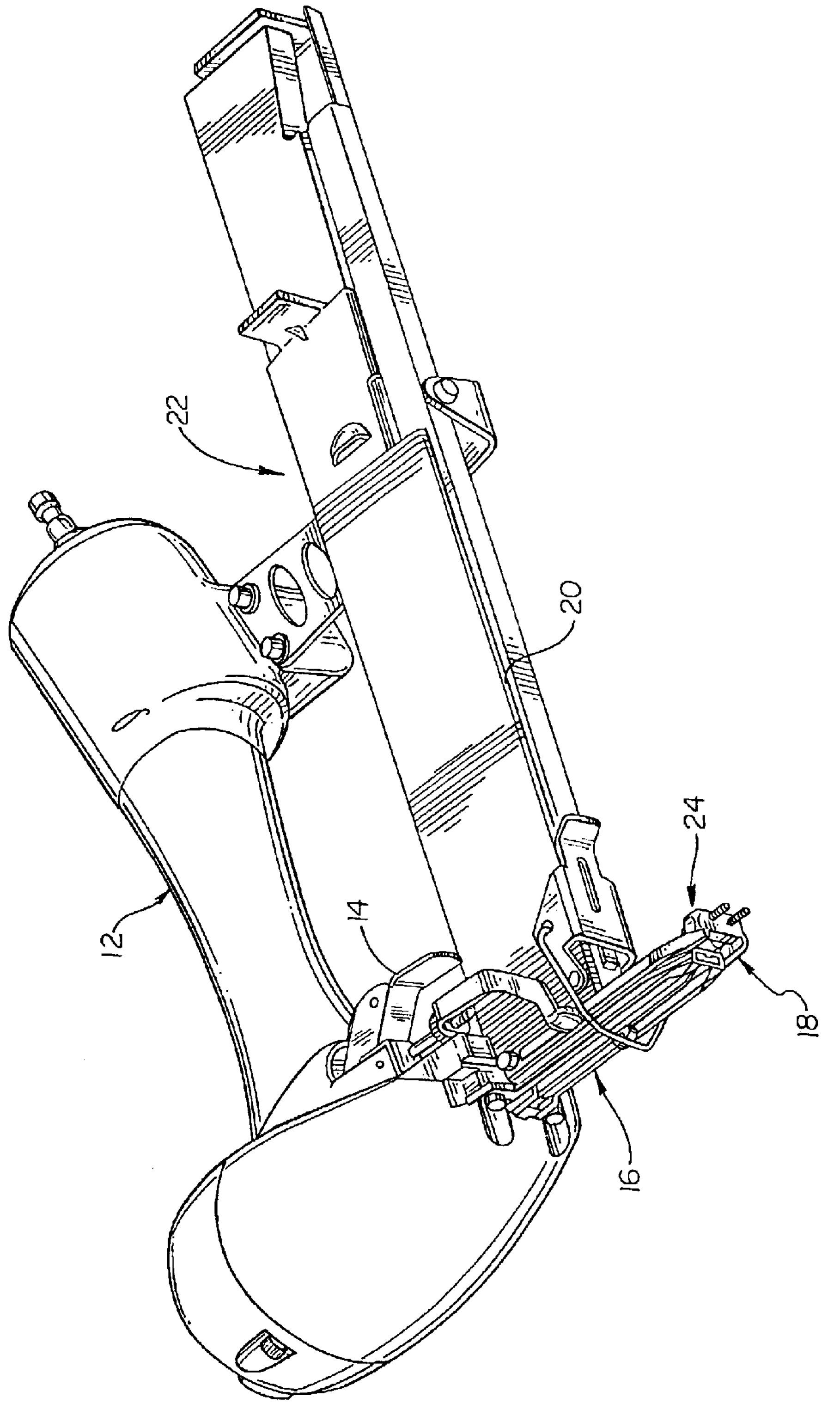
Fig.1 PRIOR ART
FIG. 1 is a perspective view of a pneumatic staple gun useful in the practice of the present invention.

Referring to the Figures, and most particularly, to FIG. 1, a prior art pneumatic stapler 10, available from the Spotnails Division of Peace Industries, Ltd. may be seen. Stapler 10 is also referred to as a striker tool. Stapler 10 has a main body 12, and a trigger 14 for delivering staples upon demand via a staple delivery mechanism 16 to a staple delivery position 18 located at the end of the mechanism 16. Staples 20 are carried by a magazine 22. It is to be understood that, although shown in connection with a specific pneumatic stapler, the present invention is suitable for use with other powered staplers, such as electric or pneumatic staplers manufactured by others.

Figure 2:
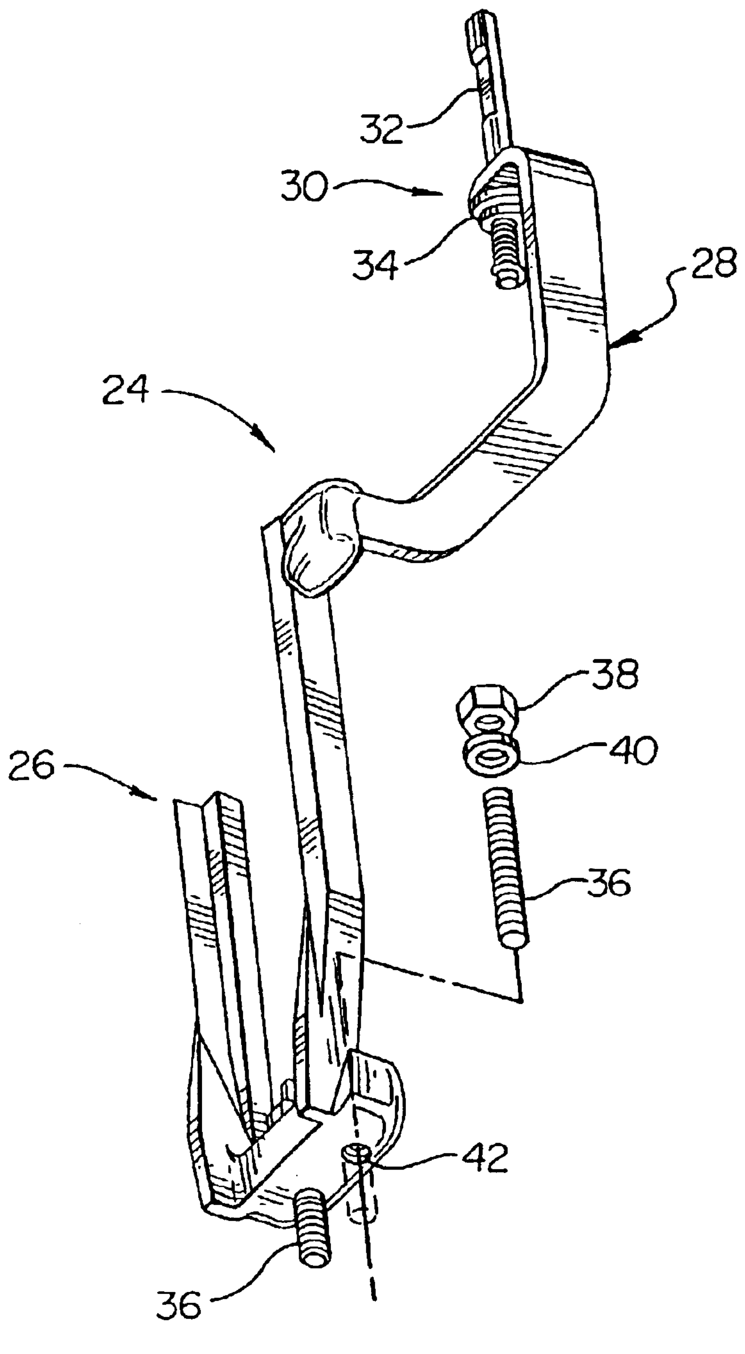
Fig.2 PRIOR ART
FIG. 2 is a prior art depth stop assembly for the staple gun of FIG. 1.

Referring now also to FIG. 2, a prior art adjustable depth stop assembly 24 may be seen. Assembly 24 has a generally U-shaped anvil member 26 welded to a support arm 28 and a threaded rod subassembly 30 having a flat 32 for attachment to stapler 10. Subassembly 30 may be adjusted using a thumbwheel 34 to set the depth to which a staple will be driven by stapler 10. The assembly 24 also carries a pair of threaded rods 36 each of which may be adjusted and locked to the anvil by a nut 38 and washer 40, it being understood that anvil 26 has a pair of threaded through holes 42 to receive rods 36.

Figure 3:
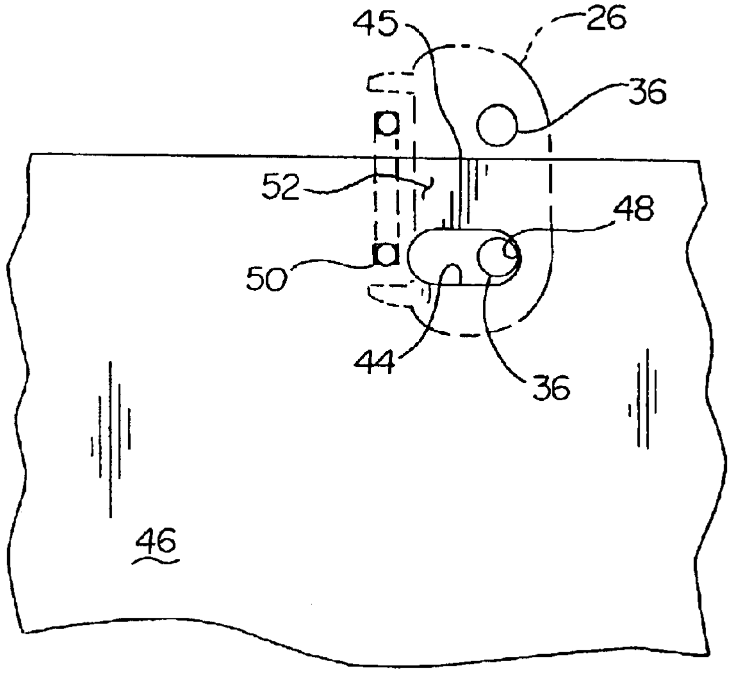
Fig.3 PRIOR ART
FIG. 3 is a plan view of the footprint of the prior art assembly of FIG. 2 shown in connection with a portion of a vinyl window frame, illustrating shortcomings of the prior art.

Referring now also to FIG. 3, the limitations of the prior art depth stop assembly 24 are illustrated. FIG. 3 shows the footprint of the prior art anvil assembly with one threaded rod 36 engaged in an oval shaped aperture 44 in a nailing flange 46 of a vinyl millwork item such as a vinyl window or door (not shown). As may clearly be seen in FIG. 3, even when the rod 36 is located at one end 48 of the aperture 44, a staple 50 is delivered into and through the body of the flange 46, and not able to be delivered through the aperture 44. This is undesirable in that the staple 50 restrains movement of the flange 46 when the staple perforates the body of the flange 46. The desirable result of locating one prong of the staple within the aperture 44 is not able to be achieved by the prior art assembly 24. It is most desirable to secure the nailing flange to the substrate to which it is attached by straddling the web 52 formed between the aperture 44 and the edge 45 of the flange 46 with the staple 50 so that the vinyl millwork item can "move" slightly as a result of the difference in the coefficients of thermal expansion of the vinyl material of the flange and the substrate to which it is attached. The threaded rods 36 are undesirable for installing vinyl millwork items because the threaded distal ends of the rods are prone to catch on the edge of the aperture 44 as the tool is inserted and withdrawn from the aperture 44, resulting in a nuisance and possible damage to the vinyl millwork item. It is to be understood that as used herein, "vinyl millwork item" includes windows, doors, siding or shutters or parts therefor made of vinyl or a similar polymer or other material having a substantial difference in its coefficient of thermal expansion with respect to the substrate to which it is attached.

Figure 4:
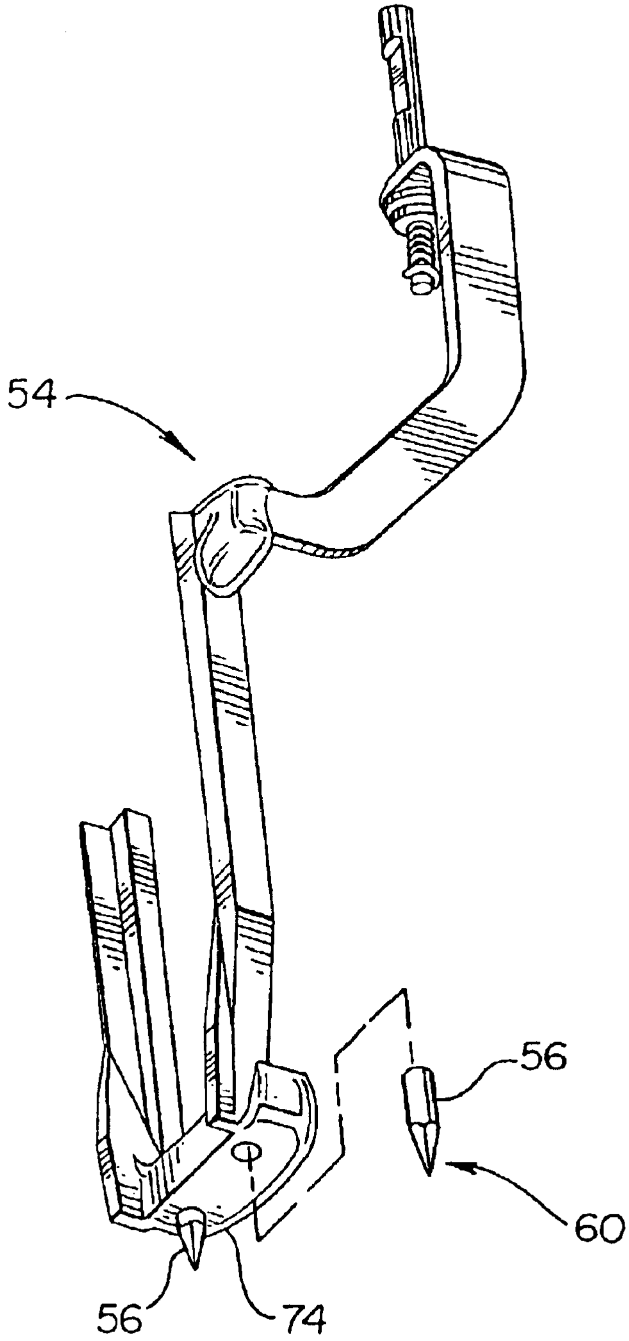
FIG. 4 is a first embodiment of the present invention in the form of an attachment for the staple gun of FIG. 1.
Figure 5:
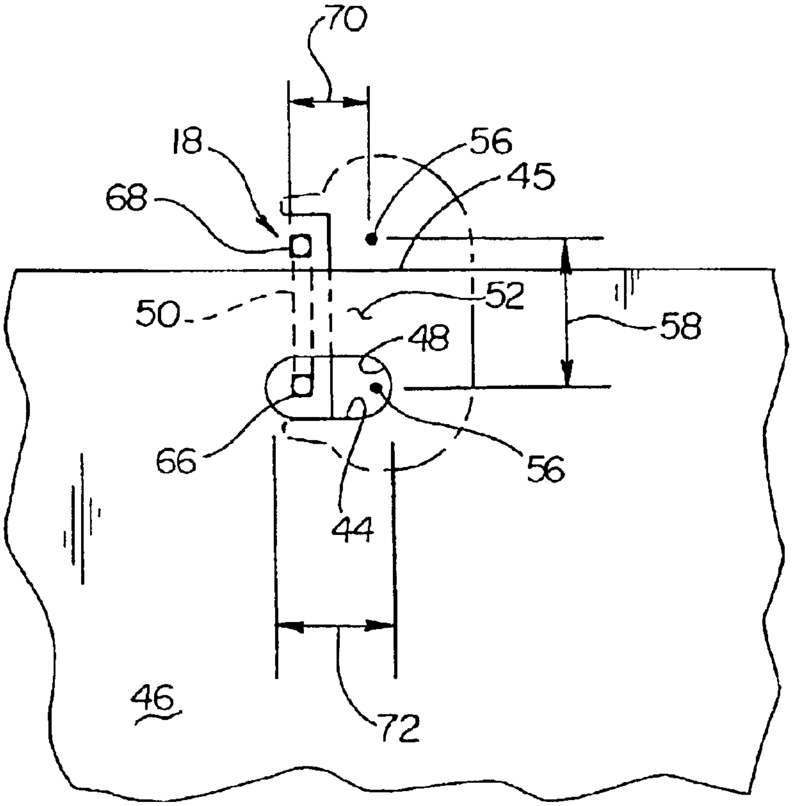
FIG. 5 is a footprint of the attachment of FIG. 4, illustrating the operation of the present invention.
Figure 6:
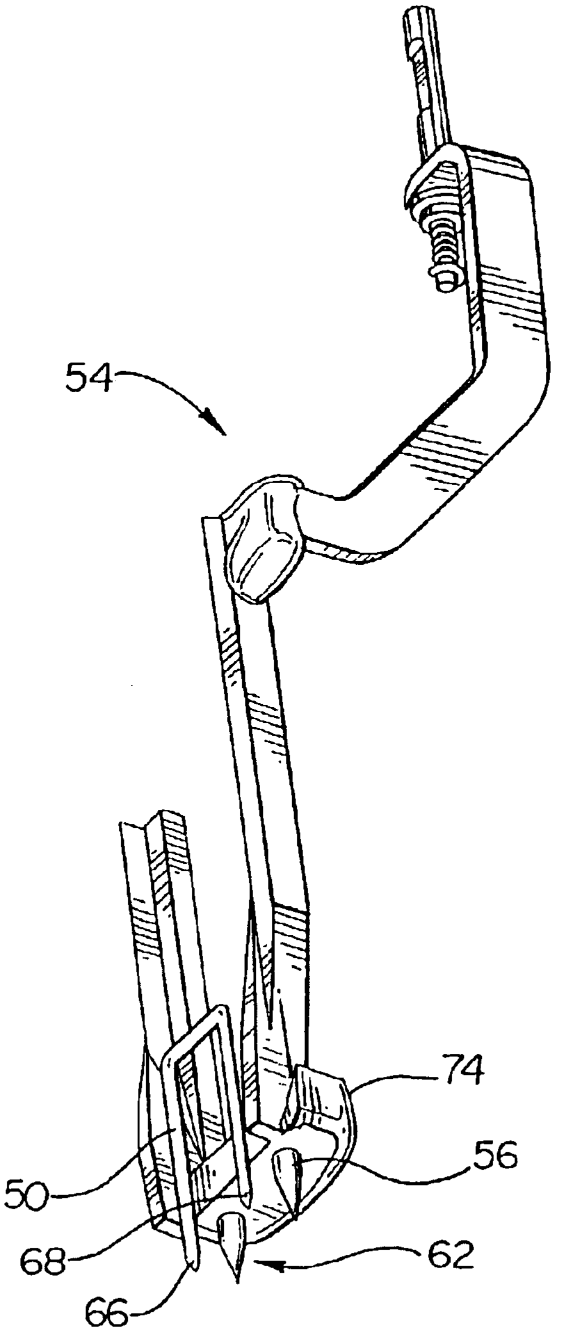
FIG. 6 is a second embodiment of the present invention, shown with a staple in a staple delivery position adjacent the attachment of this embodiment.

Referring now to FIGS. 4 and 5, various aspects of the present invention may be seen. An improved alignment attachment 54 has a pair of alignment pins 56 secured to the attachment 54 and spaced apart a distance sufficient to straddle web 52. However, the attachment 54 differs from assembly 24 in that the pins 56 are proximate the staple delivery position, being spaced from the staple delivery position by a distance less than the longitudinal dimension of the aperture 44 so that the staple will be received in the aperture 44 when one pin is located at the end 48 of the aperture 44. Also, alignment pins 56 differ from the rods 36 in that the protruding portion of each pin 56 is smooth and tapered, preferably ending in a point. The taper may be a pyramidal shape 60 (as shown in FIG. 4) or a conical shape 62 (as shown in FIG. 6) or it may be another shape 64 (as shown, for example, in FIG. 8). In all embodiments, the pins 56 are located proximate the staple delivery position 18 to deliver a staple 50 having one prong 66 in the aperture 44 and one prong 68 of the staple 50 located exteriorly of the flange 46 when one pin 56 is positioned at the end 48 of the aperture 44. In the practice of the present invention, the alignment pins 56 are to be spaced from the staple delivery position 18 by a distance 70 that is less than a long dimension 72 of the aperture 44 in flange 46.

Pins 56 may be secured to foot 74 by any convention means including threading the pin into a threaded hole and then staking pin against further rotation, by press-fitting a smooth surfaced pin into a smooth bored hole in an interference fit or by forming the pin as an integral part out of the same material as that of foot, by forging, die casting or machining, as desired.

In FIG. 6, a staple is shown in space at the staple delivery position 18 adjacent the foot 74 of attachment 54 to illustrate the proximate relationship of the pins 56 to the prongs 66, 68 of staple 50.

Figure 7:
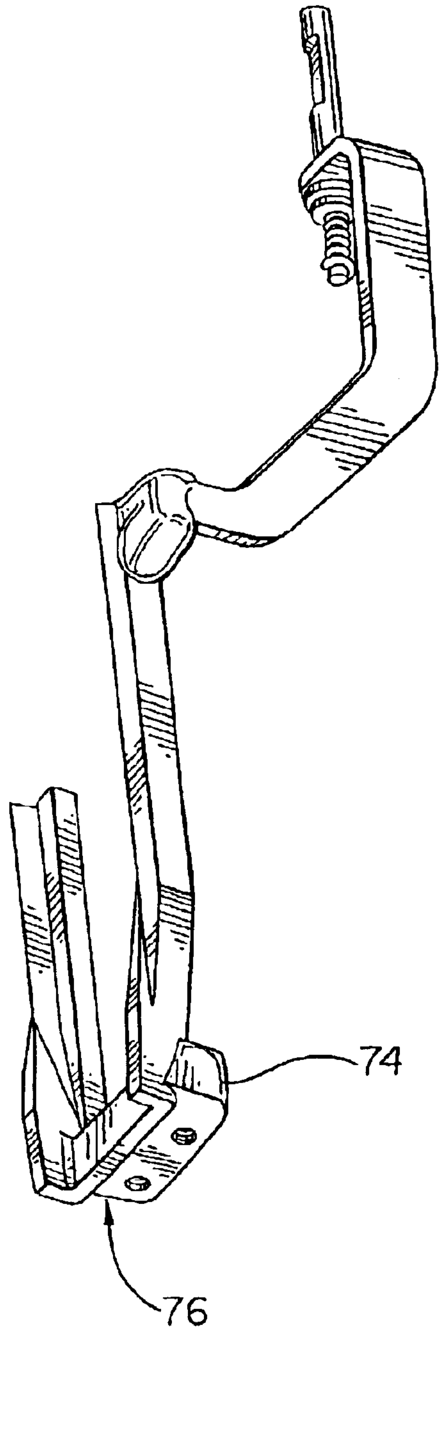
FIG. 7 is a view of the prior art attachment of FIG. 2, except with parts removed.
Figure 8:
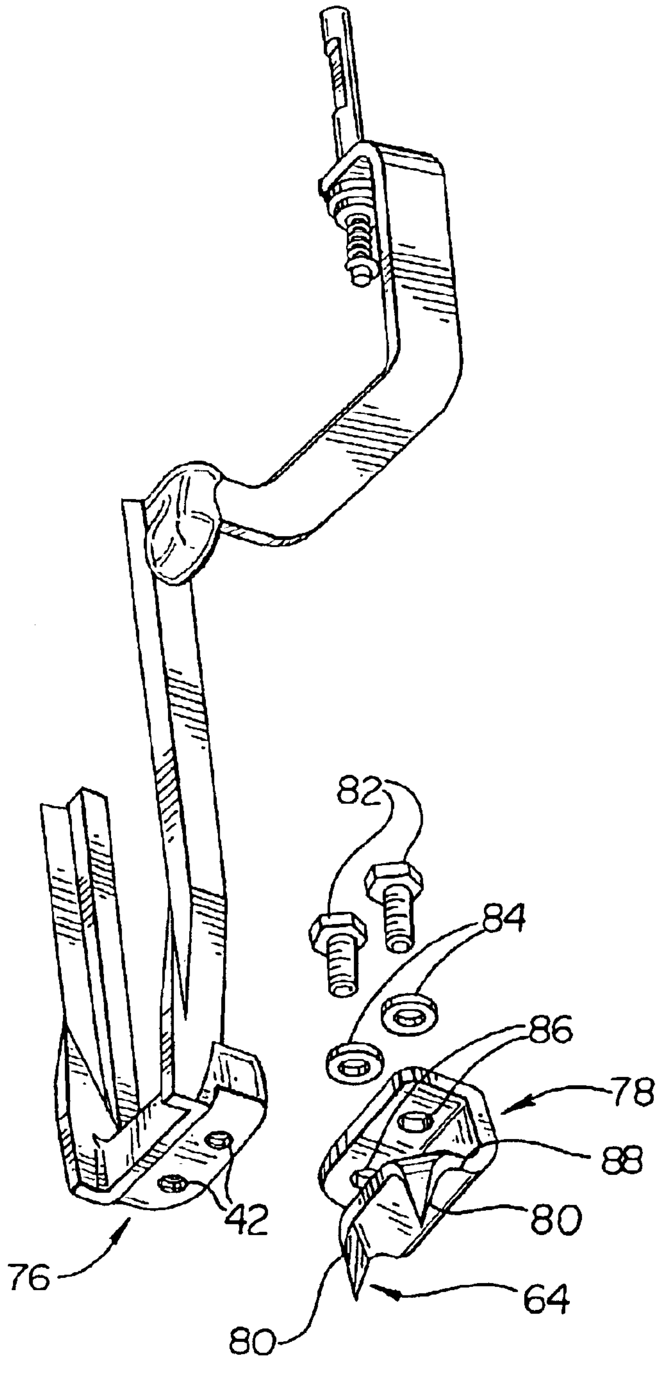
FIG. 8 is a third embodiment of the present invention utilizing the attachment of FIG. 7.

FIGS. 7 and 8 illustrate a further embodiment of the present invention wherein a step 76 is formed in foot 74, and a separate clip 78 carrying alignment pins or points 80 is attached to foot 74 using machine screws 82 and washers 84. It is to be understood that the holes 42 in foot 74 are threaded to receive screws 82, and the holes 86 in clip 78 are large enough to provide clearance for screws 82. When clip 78 is secured to foot 74, step 76 provides that the clip 78 is recessed up into the foot 74 by a distance equal to the thickness of the lower flange 88 of clip 78. In this embodiment, the alignment pins 80 are formed integrally with the clip 78.

Figure 9:
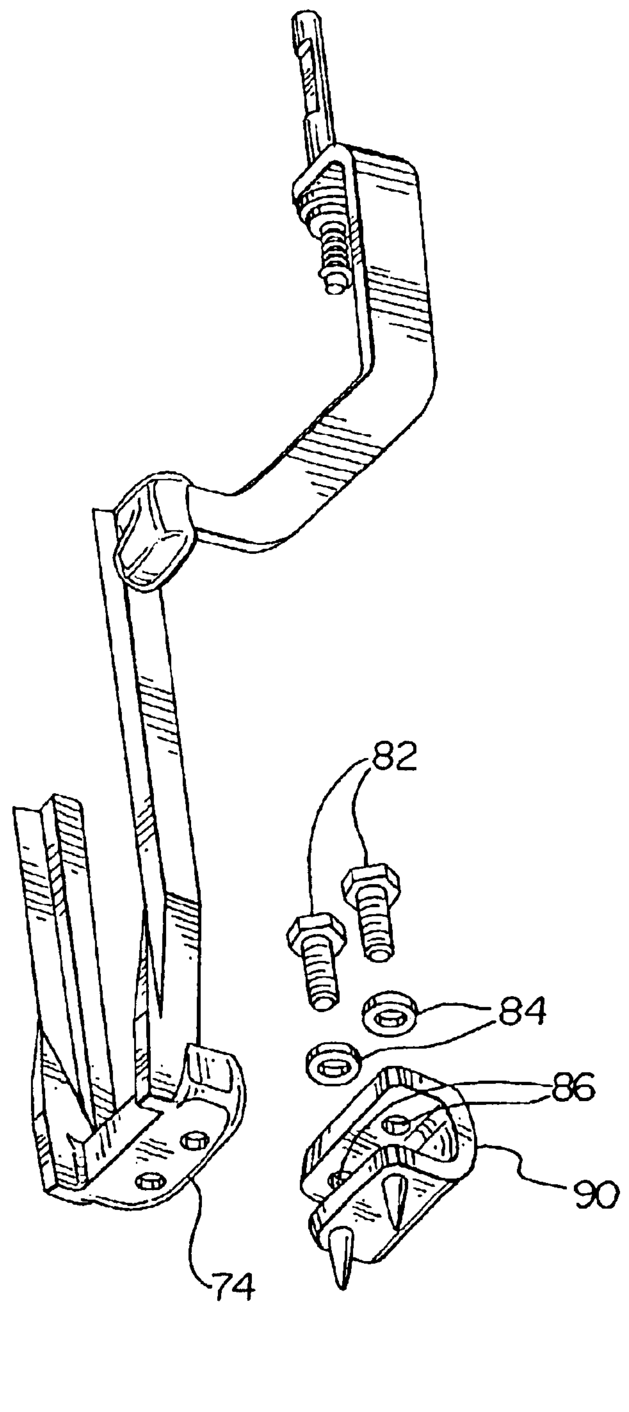
FIG. 9 is a fourth embodiment of the present invention utilizing the attachment of FIG. 7.

Alternatively, as shown in FIG. 9, pins 90 may be permanently inserted in a clip 92, and as a separate alternative, the foot 74 need not have step 76 formed therein for those applications where the additional thickness of clip 90 below foot 74 is not a hindrance.

This invention is not to be taken as limited to all of the details thereof as modifications and variations thereof may be made without departing from the spirit or scope of the invention.

What is claimed is:

1. An improved alignment attachment for a staple gun comprising a pair of alignment pins secured to the alignment attachment and spaced apart a distance sufficient to straddle a web in a vinyl nailing flange adjacent an elongated nailing aperture in the flange of a millwork item and located proximate a staple delivery position to deliver a staple having one prong in the aperture and one prong exterior of the flange when one of the alignment pins is positioned at one end of the aperture.

2. The attachment of claim 1 wherein the alignment pins are tapered.

3. The attachment of claim 2 wherein the alignment pins have a conical taper.

4. The attachment of claim 2 wherein the alignment pins have a pyramidal taper.

5. The attachment of claim 1 wherein the alignment pins arm press-fitted into the alignment attachment.

6. The attachment of claim 1 wherein the alignment pins are threaded into the attachment.

7. The attachment of claim 1 wherein the alignment pins are formed integrally with the attachment.

8. The attachment of claim 1 further comprising a clip carrying the alignment pins.

9. The attachment of claim 8 wherein the alignment pins are formed integrally with the clip.

10. The attachment of claim 8 wherein the clip includes at least one threaded fastener to secure the clip to the attachment.

11. The attachment of claim 1 wherein the alignment pins are spaced from the staple delivery position by a distance less than a long dimension of the aperture.

12. A method of installing a vinyl millwork item comprising:

a) positioning an alignment pin on an attachment of a powered stapler within an elongated aperture in a nailing flange of a vinyl millwork item proximate a staple delivery position; and b) delivering a two-pronged staple into a substrate using the powered stapler such that one prong of the staple is within the aperture and the other prong is exterior of the nailing flange.

13. The method of claim 12 further comprising straddling a web of material in the nailing flange of the millwork item by the prongs of the staple such that the vinyl millwork item is retained to the substrate by the staple and is free to accommodate thermal expansion and contraction by the nailing flange moving with respect to the staple.

14. An improved staple gun and attachment combination comprising:

a) a powered staple gun; and b) an alignment attachment secured to the staple gun and including a pair of alignment pins secured to the alignment attachment and spaced apart a distance sufficient to straddle a web in a vinyl nailing flange adjacent an elongated nailing aperture in the flange of a millwork item and located proximate a staple delivery position to deliver a staple having one prong in the aperture and one prong exterior of the flange when one of the alignment pins is positioned at one end of the aperture.

15. The improved staple gun and attachment of claim 14 wherein the staple gun is pneumatically powered.

* * * * *

UNITED STATES PATENT AND TRADEMARK OFFICE

CERTIFICATE OF CORRECTION

PATENT NO. : 6,769,193 B1
DATED : August 3, 2004
INVENTOR(S) : David Meisner

It is certified that error appears in the above-identified patent and that said Letters Patent is hereby corrected as shown below:

<u>Column 3,</u>
Line 30, delete “arm” and insert therefor -- are --

Signed and Sealed this

Eighteenth Day of January, 2005

JON W. DUDAS
*Director of the United States Patent and Trademark Office*